UNITED STATES PATENT OFFICE.

ANDREW POULSON, OF FARNWORTH, WIDNES, ENGLAND.

TREATMENT OR RENOVATION OF FOUNDRY-SAND.

1,078,062. Specification of Letters Patent. Patented Nov. 11, 1913.

No Drawing. Application filed June 2, 1913. Serial No. 771,260.

*To all whom it may concern:*

Be it known that I, ANDREW POULSON, a subject of the King of Great Britain, and a resident of Farnworth, Widnes, England, have invented certain new and useful Improvements in the Treatment or Renovation of Foundry-Sand, of which the following is a specification.

It has been previously proposed to renovate spent foundry sand by adding thereto sulfate of alumina solely or in combination with chlorids of calcium, sodium, magnesium, or other chlorids. It has also been proposed to use gelatinous silica in the renovation of foundry sand for green sand molding, the sulfate of alumina when used solely or in combination with chlorids being adapted for the treatment of sand used in dry sand molding, the making of cores, and loam molding. It is found, however, in the case of foundry sand treated with chlorids that the molds or cores have a distinct affinity for moisture. This is particularly noticeable where the sand has been treated with chlorid of magnesium. In consequence of this affinity for moisture, the surface of the core is liable to become soft, the castings produced in the molds developing blow holes or pelleting.

According to this invention it is proposed to incorporate with the sand treated in the manner referred to, magnesite, pure magnesia, or any other suitable compounds of magnesia, exclusive of chlorid of magnesium, which shall have the effect of rendering the sand moisture proof.

In carrying out the invention with reference to the preparation of sand for dry sand molding or the making of cores, I take about equal parts of sulfate of magnesia and sulfate of alumina, to which mixture water is added, suitable proportions being, sulfate of magnesia four ounces, sulfate of alumina four ounces, and water four ounces. For loam molding I prefer to take about equal parts of carbonate of magnesia and sulfate of alumina to which water is added in a similar manner and proportion. The mixtures of sulfate of alumina and water with either sulfate of magnesia or carbonate of magnesia, according to the particular requirements, produce a paste or semi-paste, which is diluted as required and incorporated with the sand to be renovated in the proportion of say 3½ lbs. of the paste mixture to one hundredweight of the sand to be treated. This is the proportion I have found to give satisfactory results in the laboratory, but for practical purposes a less proportion of paste might be used. The addition of sulfate of alumina to foundry sand acts to impart or restore cohesive properties thereto, and it is found that the addition of the paste or semi-paste, which contains sulfate of magnesia or carbonate of magnesia according to the particular molding use for which the renovator sand is prepared, acts to render the sand moisture proof when made up in the mold or as cores.

In the utilization of this process with the gelatinous silica treatment for green sand, the paste may be made more dilute or thinner than is required when treating foundry sand for the purpose of dry sand molding, making cores, or loam work.

I claim:—

A process for the treatment or renovation of foundry sand which consists in adding to the sand equal parts by weight of sulfate of alumina, sulfate of magnesia and water.

In testimony whereof I affix my signature in presence of two witnesses.

ANDREW POULSON.

Witnesses:
A. J. DAVIES,
H. WILLIAMS.